United States Patent
Tsai

(10) Patent No.: US 7,364,459 B2
(45) Date of Patent: Apr. 29, 2008

(54) ELECTRICITY OUTPUT DEVICE WITH A POWER SUPPLY

(76) Inventor: Tsung-Yen Tsai, 235 Chung-Ho Box 8-24, Taipei (TW)

( * ) Notice: Subject to any disclaimer, the term of this patent is extended or adjusted under 35 U.S.C. 154(b) by 79 days.

(21) Appl. No.: 11/334,313

(22) Filed: Jan. 19, 2006

(65) Prior Publication Data

US 2007/0167073 A1 Jul. 19, 2007

(51) Int. Cl.
*H01R 13/73* (2006.01)

(52) U.S. Cl. .................................... 439/554

(58) Field of Classification Search ............... 439/554, 439/76.1, 883, 218, 222, 527, 529–530, 533, 439/535–536, 540.1; 361/683, 686, 728, 361/730, 736, 748, 752, 760–761
See application file for complete search history.

(56) References Cited

U.S. PATENT DOCUMENTS 7,063,549 B1    6/2006  Chen
7,133,293 B2 *  11/2006  Fiorentino et al. .......... 361/752
7,187,544 B2 *  3/2007  Tsai ............................ 361/686
2005/0047079 A1 *  3/2005  Gasbarro et al. ........... 361/686
2006/0209475 A1 *  9/2006  Cabrera et al. ................ 361/1

* cited by examiner

*Primary Examiner*—Edwin A. Leon

(57) ABSTRACT

An electricity output device with a power supply comprises a power supply, a first output module and a second output module installed within the power supply. The first output module is for the electric power output from the power supply through a main power cord connected to the electricity bus. The second output module comprises a plurality of retaining columns, a retaining board and a second circuit board. There are a number of holes on the second output module each for mounting an independent first electricity connector that can be coupled with a second electricity connector attached to a transmission wire; each pair of electricity connectors are connected by a locking unit, whereby the electric power can be transmitted from the power supply. Each of the holes on the retaining board further includes a light emitting part for indicating the state of power output. Thereby, the electricity output device will be highly detachable, and the state of power supplying will be easy to recognize.

13 Claims, 9 Drawing Sheets

ELECTRICITY OUTPUT DEVICE WITH A POWER SUPPLY

FIELD OF THE INVENTION

The present invention relates to electricity output devices, more particularly to an electricity output device with a power supply, wherein the electricity output device will be highly detachable, and the state of power supplying will be easy to recognize.

BACKGROUND OF THE INVENTION

The electric power used by various components of a computer, such as the main board, the CPU, the data storage devices (hard disc drive, CD ROM, card reader, . . . etc.) and interface cards, are supplied by a power supply through various power transmission wires. The design of electricity connection and transmission between a power supply and its supporting components influence the performances of the components, which are required to be of high precision and speed nowadays.

Referring to FIG. 1, a power supply of the prior art comprises a main body 1 and power supply wires 11 connected to various computer components. The wires 11 of the components are connected to the output terminal of the main body 1 in advance. When a user wants to use one of the components, a corresponding one of the wires is connected to the power inlet of the component. However, this electricity output device of prior art is often short of power supply wires. Further, since the wires are pre-connected, there will be no flexibility of selecting a power plug of different type when the newly added component requires so. Therefore, the conventional design does not limit the expansion capacity of the power supply. On the other hand, to accommodate the variety of connector types, the power supply will have more wires, many of which are not used, than actually being used. This will make the interior space of a computer chaotic and the efficiency of heat dissipation low, therefore increasing the production cost of the computer.

Referring to FIG. 1A, a conventional electricity output device of another type has a power supply 1a, a plurality of female connector parts of 10a and a plurality of electricity connection wires 11a, each having a male connector part 12a that can be coupled with a corresponding one of the female connector parts 10a, causing the power supply 1 sending electric power to a computer.

Although the power connections of the above mentioned invention are not fixed, the connection wire between the power supply and either a computer or a peripheral is achieved when needed, which cannot be immune from the problem accidental falloff. Further, even the the connection is all right, there may be some internal problem that will result in malfunction in the power supplying. In this situation, measurement tools are needed to detect the electric connection.

SUMMARY OF THE INVENTION

Accordingly, the primary objective of the present invention is to provide an electricity output device with a power supply, which has a second output module connected to the power supply for improving the problems of its connection stability with a power cord and recognizing the state of power giving. The electricity output device therefore provides power cords with a connection that is not easily detachable.

To achieve above object, the present invention provides an electricity output device with a power supply. The output device comprises a power supply; a first output module installed within said power supply; a second output module having having a retaining board with at least one hole-like connector mount, at least one first connector mounted on said connector mount and at least one transmission wire provided with a second connector for connecting said first connector, said transmission wire further comprising a power plug; and a second circuit board connected to at least one of said first connectors for supplying power.

Furthermore, the present invention provides an electricity output device with a power supply. The output device comprises a power supply provided with at least a set of connector holes and through holes; a first output module installed within said power supply having a first insertion hole on a chassis board of said power supply and a power connection wire with a second connector coupled with one of first insertion hole with a second insertion head, said power connection wire further comprising a power plug; a second output module installed within said power supply having a retaining board with at least one hole-like connector mount, at least one first connector mounted on said connector mount and at least one transmission wire provided with a second connector for connecting said first connector, said transmission wire further comprising a power plug; and a second circuit board connected to at least one of said first connectors for supplying power.

The various objects and advantages of the present invention will be more readily understood from the following detailed description when read in conjunction with the appended drawings.

DETAILED DESCRIPTION OF THE PREFERRED EMBODIMENTS

Figure 1:
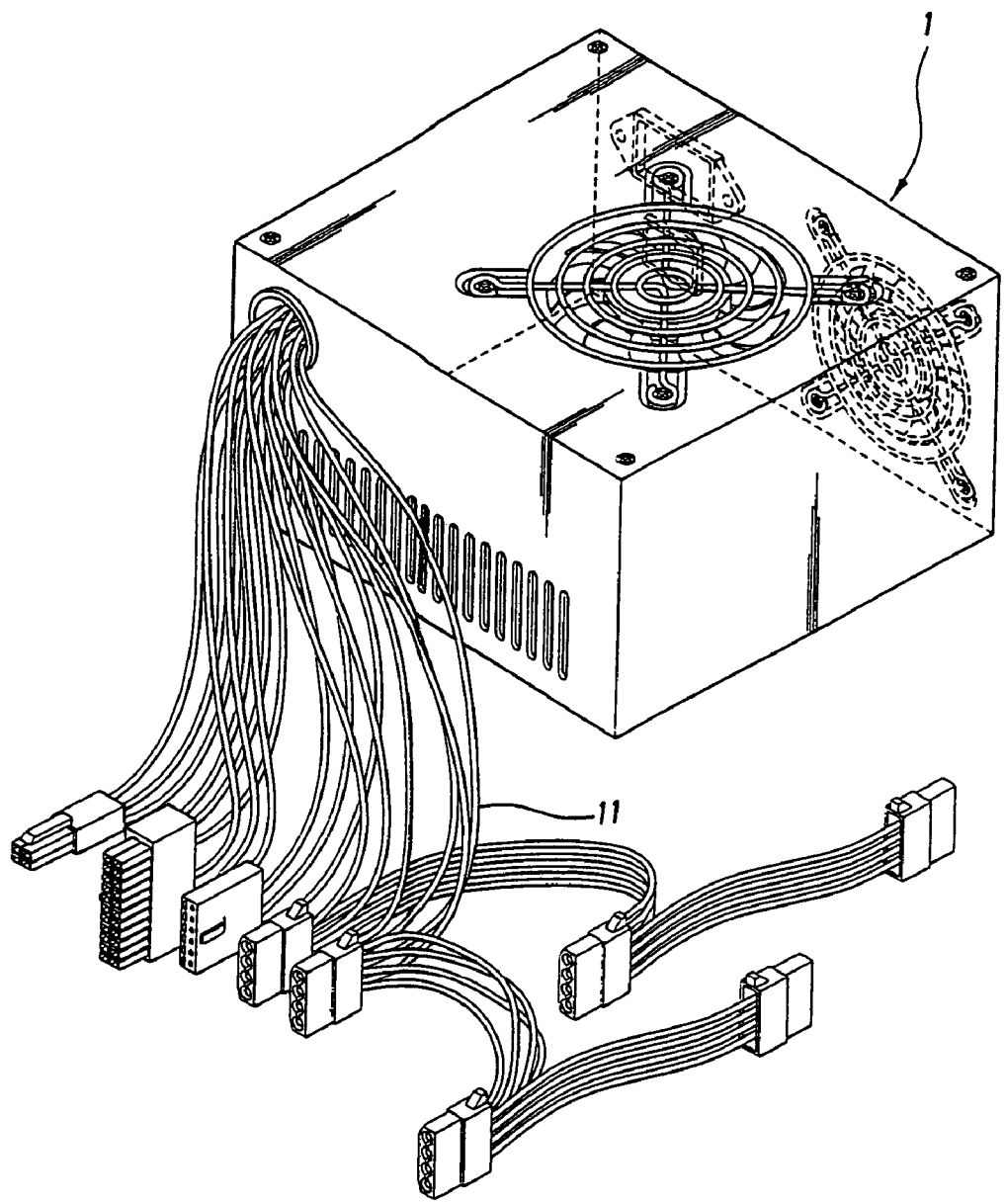
FIG. 1 is a perspective view of a power supply of the prior art.
Figure 1A:
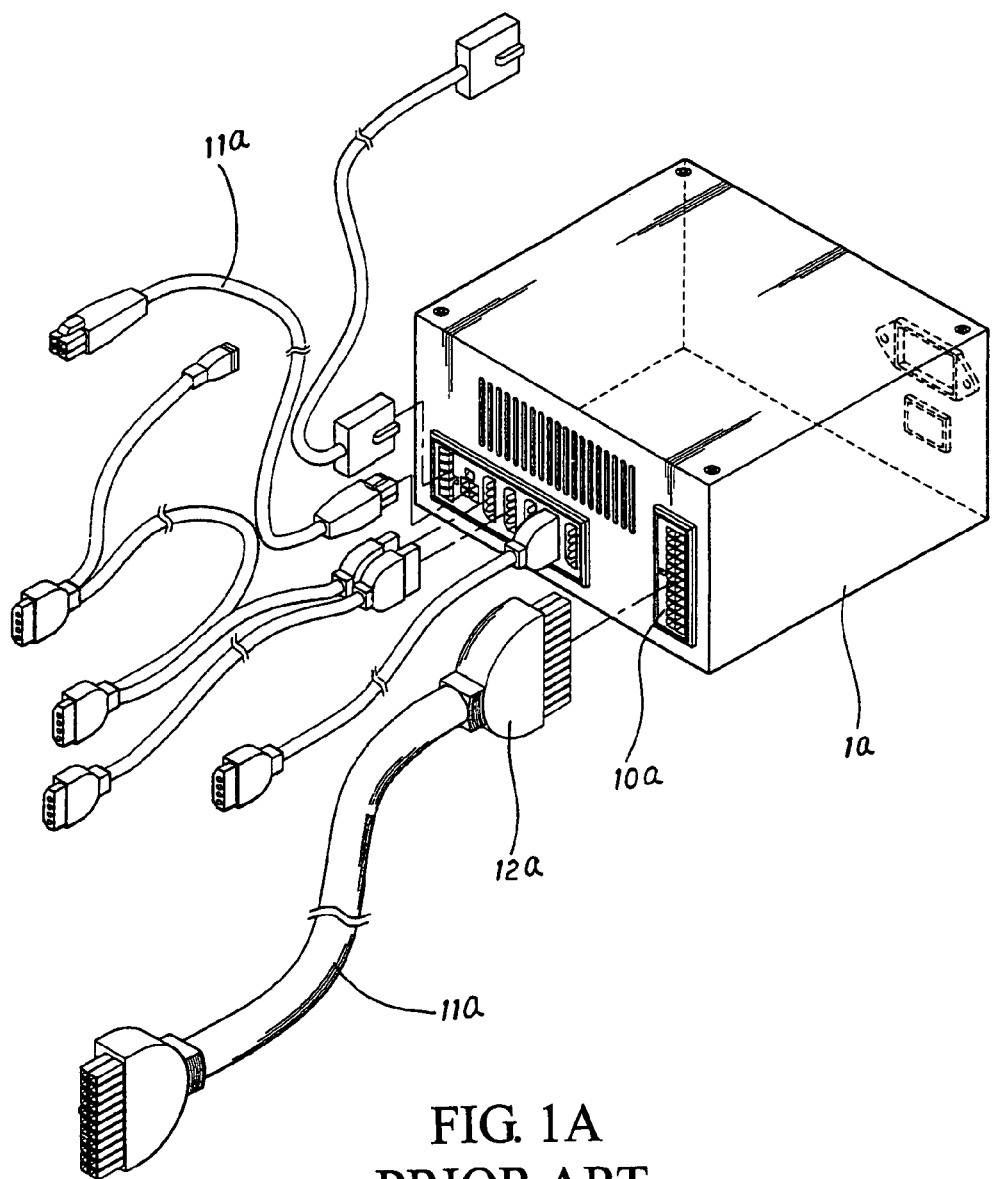
FIG. 1A is a perspective view of another power supply of the prior art.
Figure 2:
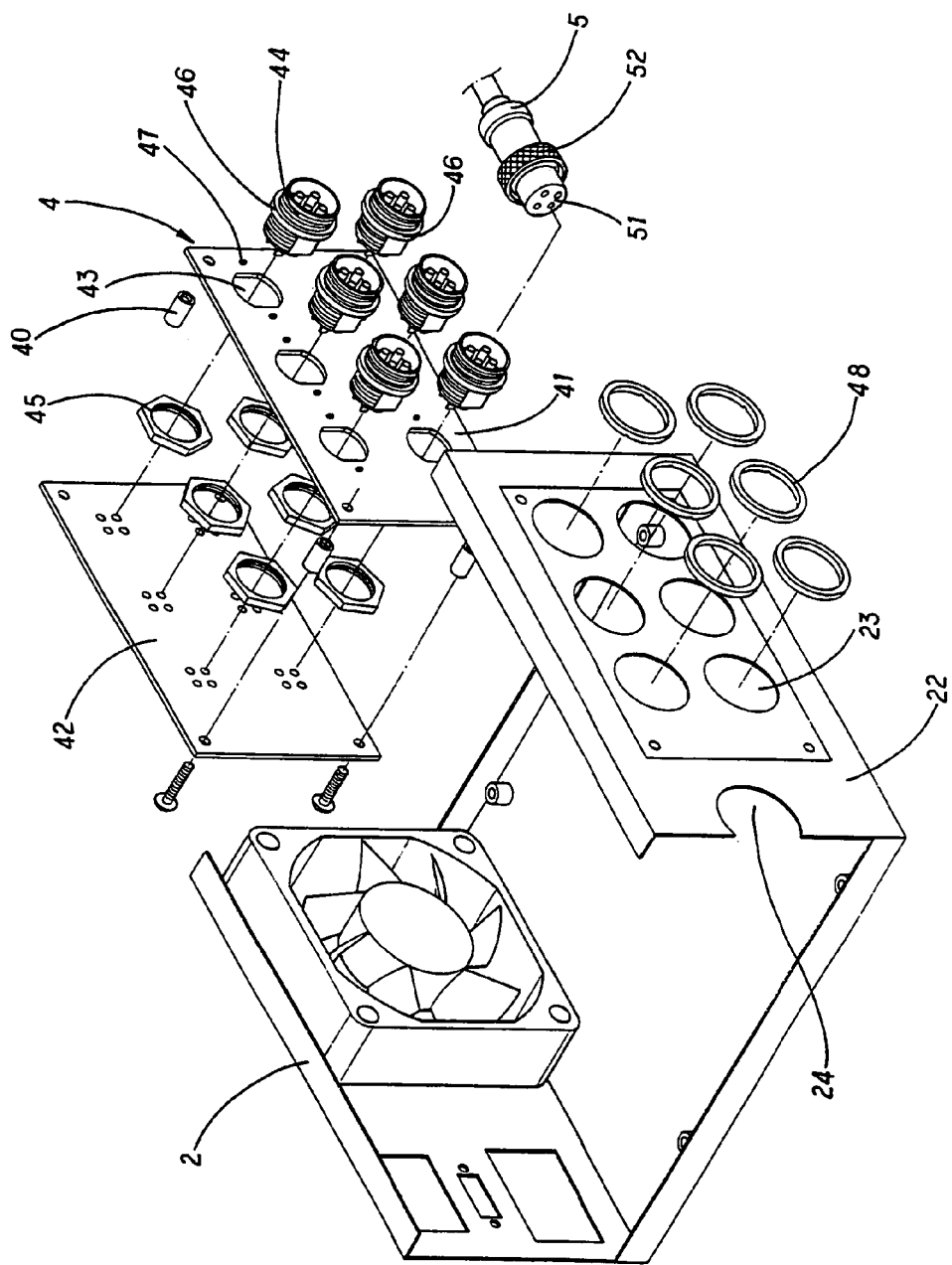
FIG. 2 is an exploded perspective view of the first preferred embodiment of the present invention as an electricity output device with a power supply.
Figure 3:
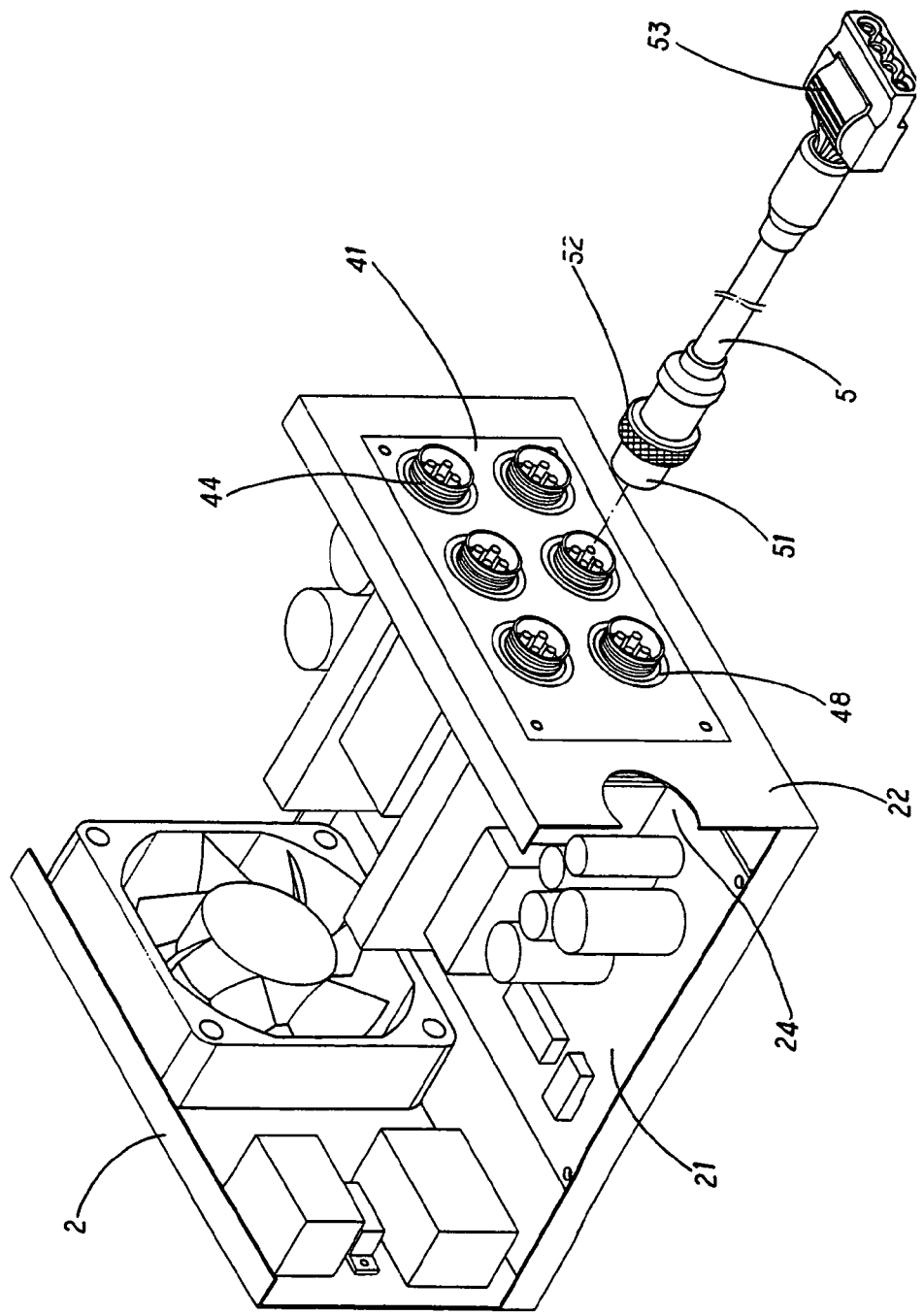
FIG. 3 is a perspective view of the electricity output device with a power supply in FIG. 2.
Figure 4:
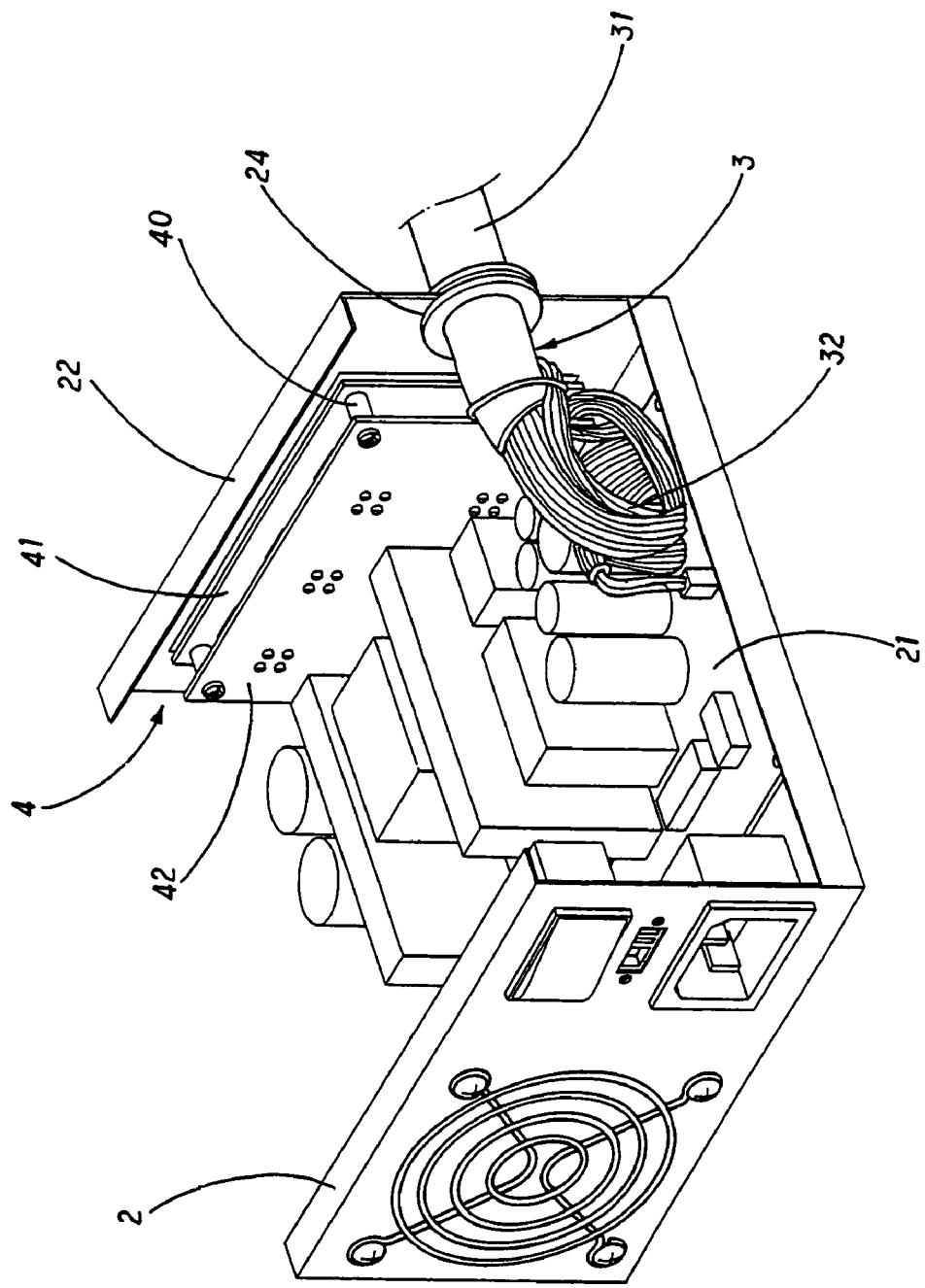
FIG. 4 is a rear perspective view of the electricity output device with a power supply in FIG. 2.
Figure 5:
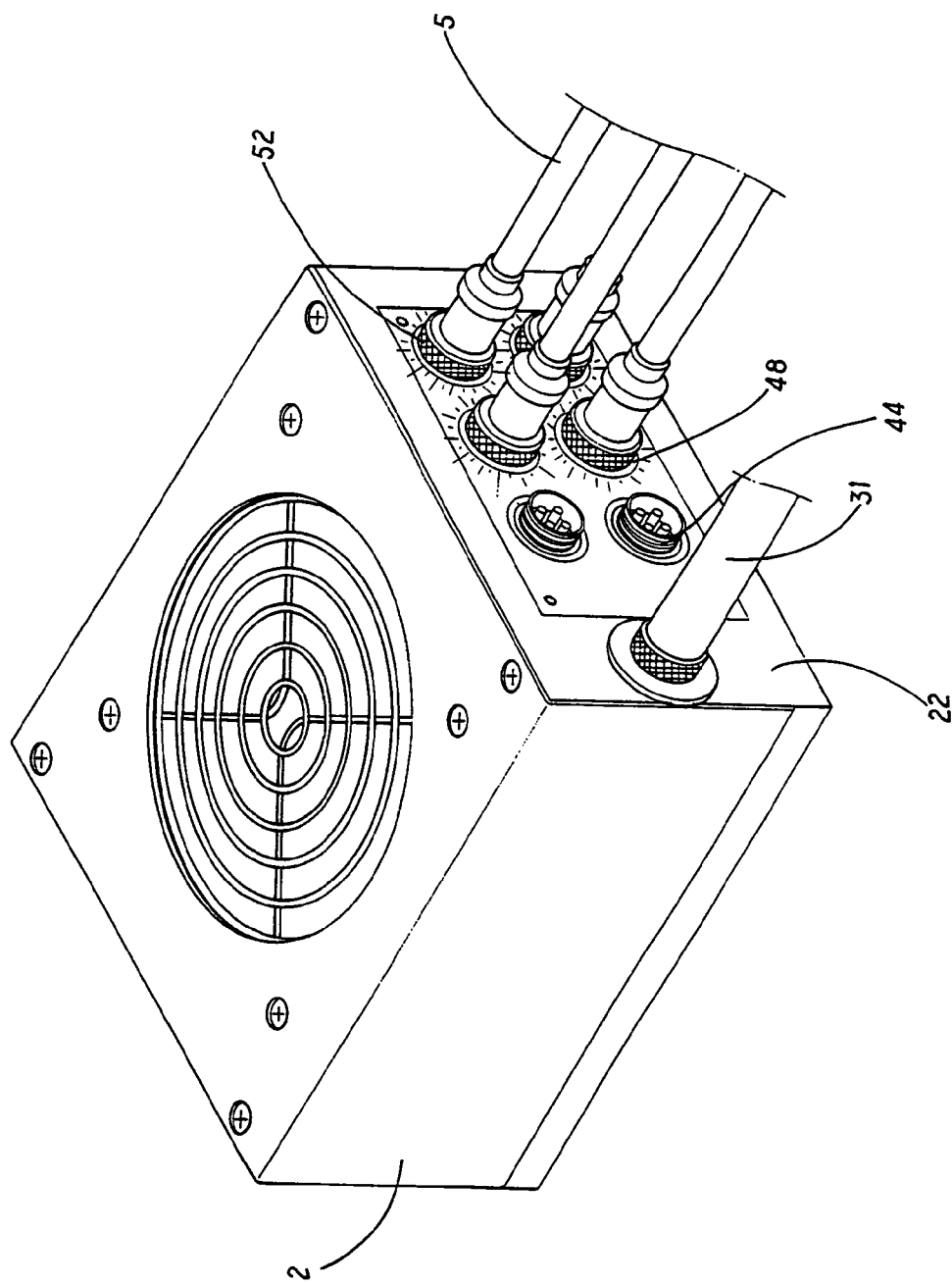
FIG. 5 illustrates the use of the first preferred embodiment of the present invention.
Figure 6:
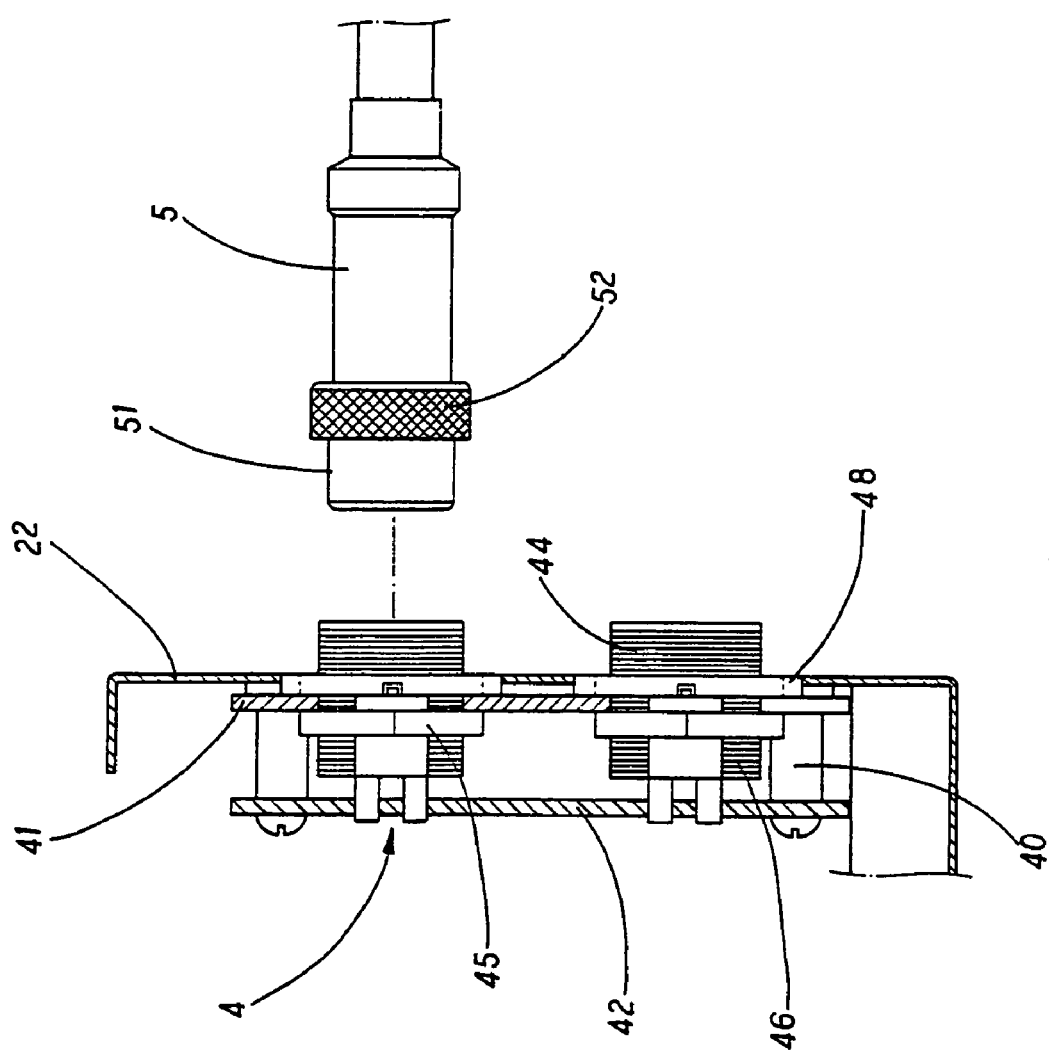
FIG. 6 is a cross-sectional view of the the first preferred embodiment of the present invention.

Referring to FIGS. 2 to 6, an electricity output device with a power supply comprises a power supply 2, a first output module 3 disposed in the power supply 2 and a second output module 4 with a plurality of independent electricity supplying ports, whereby the electricity output device will be highly detachable, and whereby the state of power supplying will be easy to recognize.

The power supply 2 further includes a first circuit board 21, at least one chassis board 22, a plurality of connector holes 23 and at least one through hole 24 on a rear wall of the power supply 2. The connector holes 23 may differ in diameters and are arranged according to the corresponding ports on the second output module 4.

The first output module 3 can be the main power cord 31 of a power supply of the prior art, with one terminal connected to the first circuit board 21 in the power supply 2 and another terminal connected to a power outlet connector for supplying the power of computer components such as a main board or a CPU.

The second output module 4 comprises a plurality of retaining columns 40 that separate a retaining board 41 and a second circuit board 42. The second circuit board 42 is electrically connected to the first circuit board 21. The retaining board 41 further includes a plurality of hole-likeconnector mounts 43, on each of which there is a nut 45 coupled with a first connector 46 with an outer thread 44; the first connectors 46 pass through the connector holes 23 on the chassis board 22 and extend out of the power supply 2. Each of the first connectors 46 is electrically connected to a corresponding connector mount 43 on the second circuit board 42 to form a singular power outlet that can supply the power of a computer component by a transmission cord 5.

Each of the first connectors 46 is a standard electric connector valid to the outlet of a corresponding computer peripheral device. It can be either the female or the male part of a transmission connector; through it is a four-pin female connector part in this preferred embodiment.

The second output module 4 further includes an equal number of light emitting elements 47 and transparent parts 48 to the connector mounts 43. The light source of the light emitting elements 47 can be a light emitting diode (LED) or any light emitting means, which are mounted on the retaining board 41 about the connector mounts 43. The light emitting elements 47 will be switched on in accordance with the activation of the power supply. The transparent parts 48 is made of a plastic material, preferably selected from acrylic or glass, thereby producing a diffusive effect of the ray of the light emitting elements 47.

At least one transmission wire 5 is connected to the first connector 46 of the second output module 4. The transmission wire 5 further includes a second connector 51 corresponding to one of the first connectors 46. It further comprises a locking unit 52 with an inner thread and a retaining ring, whereby either of the first connectors 46 can be engaged with the second connector 51. The other end of the transmission wire 5 is provided with a power socket 53 for supplying power to a computer or a peripheral device.

To use the present invention, the main power cord 31 of the first output module 3 is connected to the power supply for the computer main board, CPU and so on. The first connectors 46 of the second output module 4 are then connected to the second connector 51 of the power transmission wires 5. Locking mechanisms 52 will be engaged with the outer threads 44 on the first connectors 46, whereby the electric connection is stable.

At the same time, the light emitting element 47 corresponding to a first connector 46 and its connector mount 43 will be turned on with the acitivation of the power supply, whereby a user can immediately recognize the validity of the power connection.

Figure 7:
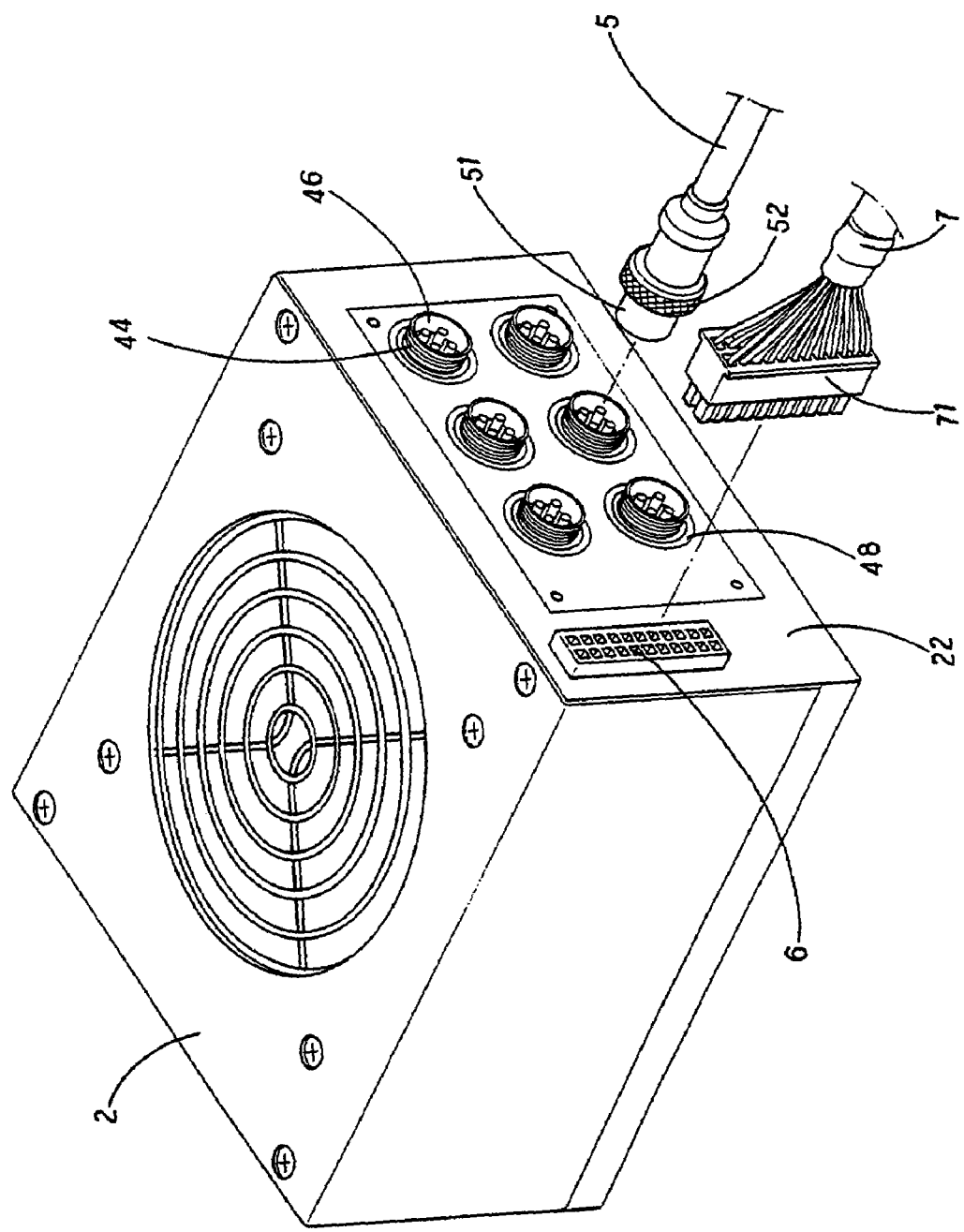
FIG. 7 is perspective view of the second preferred embodiment of the present invention as an electricity output device with a power supply.
Figure 8:
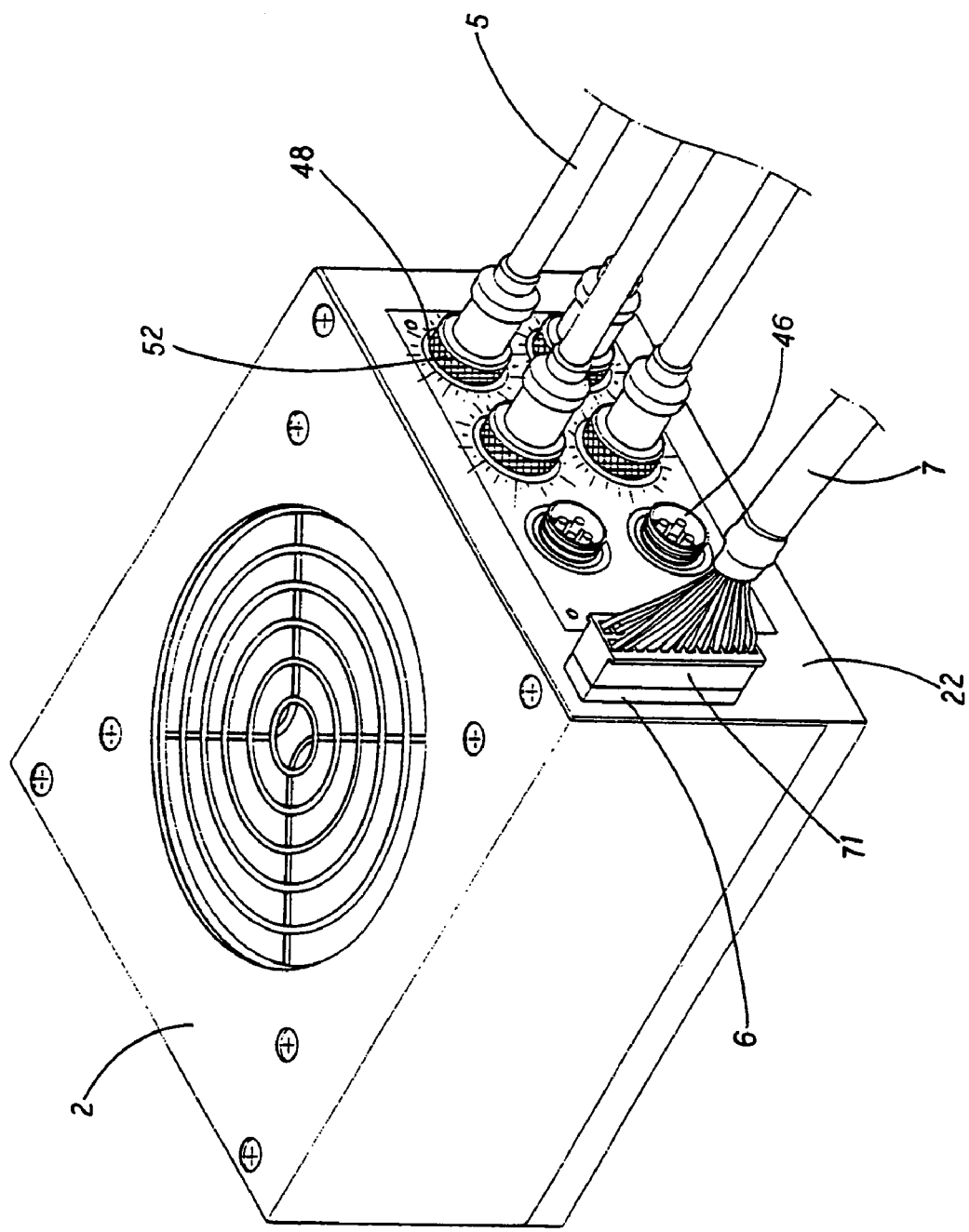
FIG. 8 illustrates the use of the second preferred embodiment of the present invention.

Further, referring to FIGS. 7 and 8, another preferred embodiment of the present invention as an electricity output device including a power supply is similar to the preferred embodiment illustrated by FIGS. 2 to 6. This preferred embodiment differs from the previous in the arrangement of the first output module 3, which is similar to the second output module 4, as the first connectors 6 with a multiple pin structure and is electrically connected to the first circuit board 21. Each of the first connectors 6 is able to be connected to a power connection wire 7 through a second connector 71.

Because of the total separation between the power supply 2, the power transmission wires 7 and the connection wires 7, as well as of the reliable locking mechanism between the connectors, the electricity output device including a power supply of the present invention is easy to be packed and transported. Further, without idle wires, the interior space in a computer chassis will be cleaner, and the heat dissipation will be much improved.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electricity output device with a power supply, comprising:
    a power supply having a chassis board and said chassis board being formed with a plurality of connector holes;
    a first output module installed within said power supply;
    a second output module having a retaining board with at least one hole-like connector mount, at least one first connector mounted on said connector mount and at least one transmission wire provided with a second connector for connecting said first connector, said transmission wire further comprising a power plug; and
    a second circuit board connected to at least one of said first connectors 46 for supplying; and
    wherein said first connector passes through said connector holes of said chassis board and said connector mount; and pins at one end of the first connector are inserted into pin holes in said second circuit board; and
    wherein said second output module further includes at least a light emitting element for indicating the state of power supply activation; and at least one transparent part has a round shape and is arranged around the connector hole.

2. The electricity output device with a power supply of claim 1 wherein each of said light emitting elements is a light emitting diode (LED).

3. The electricity output device with a power supply of claim 1 wherein said second output module further includes a plurality of retaining columns for maintaining spacing with said second circuit board.

4. The electricity output device with a power supply of claim 1 wherein each of said first connectors is capable of beign connected to a power inlet selected form a computer and a computer peripheral device and is selected from a female member and male member of a regular electric connector.

5. The electricity output device with a power supply of claim 1 wherein said second output module further includes at least a light emitting element for inducating the state of power supply activation.

6. The electricity output device with a power supply of claim 5 wherein said transparent parts are made of a flexible plastic material, preferably selected from acrylic or glass; each of said transparent parts being mounted in front of a corresponding one of said light emitting elements.

7. The electricity output device with a power supply of claim 1 wherein each of said first connectors is locked to one of said connector mounts on said retaininig board; one end of each of said first connectors being provided with an outer thread and going through said chassis board of said power supply for outreaching said power transmission wire.

8. The electricity output device with a power supply of claim 7 wherein each of said first connectors is capable of beign connected to a power inlet selected form a computer and a computer peripheral device and is selected from a female member and male member of a regular electric connector;

each of said second connectors is selected from a female member and male member of a regular electric connector, which is complementary to said first connectors; and said second connector further includes a locking means for locking itself to an outer thread of said first connector.

9. The electricity output device with a power supply of claim 1 wherein each of said second connectors is selected from a female member and male member of a regular electric connector, which is complementary to said first connectors.

10. The electricity output device with a power supply of claim 9 wherein said second connector further includes a locking means for locking itself to an outer thread of said first connector.

11. An electricity output device with a power supply, comprising:

a power supply having a chassis board and said chassis board being provided with at least a set of connector holes and through holes;

a first output module installed within said power supply having a first insertion hole on a chassis board of said power supply and a power connection wire with a second connector coupled with one of first insertion hole with a second insertion head, said power connection wire further comprising a power plug;

a second output module installed within said power supply having a retaining board with at least one hole-like connector mount, at least one first connector mounted on said connector mount and at least one transmission wire provided with a second connector for connecting said first connector, said transmission wire further comprising a power plug; and a second circuit board connected to at least one of said first connectors for supplying power; and wherein said first connector passes through said connector holes of said chassis board and said connector mount; and pins at one end of the first connector are inserted into pin holes in said second circuit board.

12. The electricity output device with a power supply of claim 11 wherein each of said first connectors is selected from a female member and male member of a regular electric connector.

13. The electricity output device with a power supply of claim 12 wherein each of said second connectors is selected from a female member and male member of a regular electric connector, which is complementary to said first connectors.

\* \* \* \* \*